US012587222B2

(12) United States Patent
Zhao et al.

(10) Patent No.: US 12,587,222 B2
(45) Date of Patent: Mar. 24, 2026

(54) PASSIVE INTERMODULATION MITIGATION COEFFICIENT DETERMINATION BASED ON RECEIVED DATA

(71) Applicant: XILINX, INC., San Jose, CA (US)

(72) Inventors: Hongzhi Zhao, Los Gatos, CA (US); Ghazaleh Ardeshiri, Sunnyvale, CA (US); Hemang M. Parekh, San Jose, CA (US)

(73) Assignee: XILINX, INC., San Jose, CA (US)

( * ) Notice: Subject to any disclaimer, the term of this patent is extended or adjusted under 35 U.S.C. 154(b) by 417 days.

(21) Appl. No.: 18/128,378

(22) Filed: Mar. 30, 2023

(65) Prior Publication Data

US 2024/0333326 A1      Oct. 3, 2024

(51) Int. Cl.
H04B 1/10        (2006.01)
H04B 1/00        (2006.01)
(52) U.S. Cl.
CPC ......... H04B 1/1036 (2013.01); H04B 1/0075 (2013.01)
(58) Field of Classification Search
CPC ... H04B 1/1036; H04B 1/0075; H04B 1/0475
See application file for complete search history.

(56) References Cited

U.S. PATENT DOCUMENTS

| | | | | |
|---|---|---|---|---|
| 11,025,464 | B1 * | 6/2021 | Chen | ........................ H04L 25/02 |
| 2013/0310090 | A1 * | 11/2013 | Bevan | .................. H04B 7/0413 |
| | | | | 455/501 |

| | | | | |
|---|---|---|---|---|
| 2014/0036736 | A1 * | 2/2014 | Wyville | ................. H04B 1/525 |
| | | | | 370/278 |
| 2014/0036969 | A1 * | 2/2014 | Wyville | ................... H04B 1/38 |
| | | | | 375/219 |
| 2015/0257165 | A1 * | 9/2015 | Gale | ................... H04W 72/541 |
| | | | | 370/329 |
| 2016/0380668 | A1 * | 12/2016 | Aoki | ....................... H04L 5/143 |
| | | | | 370/278 |
| 2017/0019279 | A1 * | 1/2017 | Tobisu | ............... H04L 27/0008 |
| 2017/0141938 | A1 * | 5/2017 | Chen | ........................ H04B 1/12 |
| 2017/0207862 | A1 * | 7/2017 | Aoki | ........................ H04L 25/08 |
| 2017/0207886 | A1 * | 7/2017 | Kawasaki | .............. H04B 1/123 |
| 2018/0062696 | A1 * | 3/2018 | Kawasaki | ................ H04B 1/50 |
| 2018/0139032 | A1 * | 5/2018 | Ishikawa | ............... H04L 5/1461 |

(Continued)

*Primary Examiner* — Jinsong Hu
*Assistant Examiner* — Rui M Hu
(74) *Attorney, Agent, or Firm* — Patterson + Sheridan, LLP

(57)        ABSTRACT

Passive intermodulation (PIM) correction circuitry mitigates the effects of PIM within receiver circuitry. The PIM correction circuitry includes modeling circuitry, adapt circuitry, and compensation circuitry. The modeling circuitry receives one or more transmitter data signals. Further, the modeling circuitry generates output signals based on the one or more transmitter data signals, and a correction signal based on the output signals and correction coefficients. The correction signal is combined with an input signal to generate a corrected output signal. The adapt circuitry receives a first output signal of the output signals and the corrected output signal. The adapt circuitry correlates the first output signal with the corrected output signal to generate update values. The compensation circuitry receives the update values and generates updated correction coefficients based on the update values.

20 Claims, 7 Drawing Sheets

Tx Channel 115

IC 105

Tx Data

PA 120    Tx Filter 125

PIM Cancellation Circuit 110

Rx Data

LNA 140    Rx Filter 145

Antenna 160

Duplexer 130

PIM 135

Rx Channel 150

Base Station 100

(56)     References Cited

U.S. PATENT DOCUMENTS

| 2018/0248572 | A1* | 8/2018 | Ishikawa | ............... | H04B 1/0475 |
| 2018/0337700 | A1* | 11/2018 | Huang | ................... | H04L 5/1423 |
| 2018/0351588 | A1* | 12/2018 | Ohta | .................... | H04B 1/0064 |
| 2020/0021323 | A1* | 1/2020 | Cyzs | ...................... | H04B 1/123 |
| 2022/0109462 | A1* | 4/2022 | Fleischer | ................. | H04B 1/12 |
| 2023/0179455 | A1* | 6/2023 | Chen | ................... | H04L 27/0008 |
| | | | | | 375/285 |

* cited by examiner

PASSIVE INTERMODULATION MITIGATION COEFFICIENT DETERMINATION BASED ON RECEIVED DATA

TECHNICAL FIELD

Examples of the present disclosure generally relate to determining coefficients to correct for passive intermodulation (PIM) within an input signal based on received data signals.

BACKGROUND

Passive intermodulation (PIM) is a growing issue in communication systems (e.g., cellular networks and satellite communication systems, among others). PIM may become a problem in systems that use transmit-receive shared antennas. Further, PIM issues may occur as existing equipment ages, when co-locating new carriers, or when installing new equipment. PIM is a particular issue when overlaying (duplexing) new carriers into old antenna runs.

PIM can create interference that reduces the receive sensitivity and/or communication functionality of a communication system. This interference can affect both the portion of the communication system that creates the PIM, as well as other nearby receiver devices. In cellular communication systems, PIM can create interference and reduce receiver device sensitivity. For example, in wireless communication system (e.g., Long Term Evolution (LTE), among others), if two transmitter carriers transmitting from a base station system experience PIM interference, the intermodulation can lead to a component that falls into the receive band of the corresponding receiver devices. The intermodulation negatively affects the receiver devices, and potentially other parts of the corresponding communication system.

As the communication spectrums become more crowded and antenna sharing schemes become more common, there is a corresponding increase in the possibility of PIM interference from the intermodulation of different carriers. Accordingly, the traditional ways of mitigating the effects of PIM are less affective.

SUMMARY

In one example, a passive intermodulation (PIM) correction circuitry includes modeling circuitry, adapt circuitry, and compensation circuitry. The modeling circuitry receives one or more transmitter data signals. Further, the modeling circuitry generates output signals based on the one or more transmitter data signals, and a correction signal based on the output signals and correction coefficients. The correction signal is combined with an input signal to generate a corrected output signal. The adapt circuitry receives a first output signal of the output signals and the corrected output signal. The adapt circuitry correlates the first output signal with the corrected output signal to generate update values. The compensation circuitry receives the update values and generates updated correction coefficients based on the update values.

In one example, an integrated circuit (IC) device includes PIM correction circuitry. The PIM correction circuitry includes modeling circuitry, adapt circuitry, and compensation circuitry. The modeling circuitry receives one or more transmitter data signals, and generates output signals based on the one or more transmitter data signals and a correction signal based on the output signals and correction coefficients. The correction signal is combined with an input signal to generate a corrected output signal. The adapt circuitry receives a first output signal of the output signals and the corrected output signal. The adapt circuitry correlates the first output signal with the corrected output signal to generate update values. The compensation circuitry receives the update values and generate updated correction coefficients based on the update values.

In one example, a method includes outputting a corrected output signal based on an input signal and a correction signal, and receiving, via modeling circuitry of passive PIM correction circuitry, one or more transmitter data signals. Further, the method includes generating, via the modeling circuitry, output signals based on the one or more transmitter data signals and the correction signal based on the output signals and correction coefficients. The method further includes correlating, via adapt circuitry of the PIM circuitry, a first output signal of the output signals with the corrected output signal to generate one or more update values, and generating updated correction coefficients based on the update values.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1:
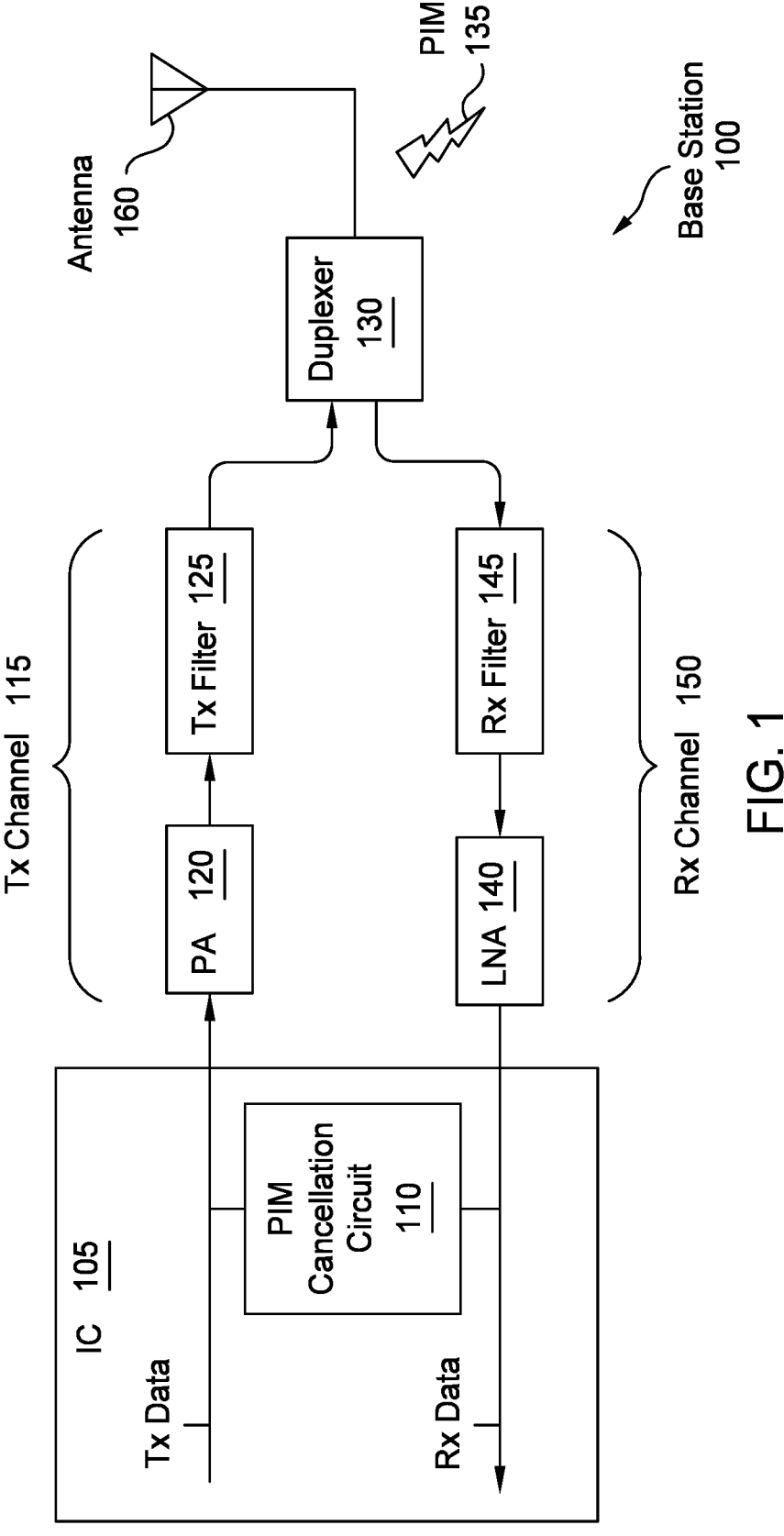
FIG. 1 is a block diagram of a base station that experiences passive intermodulation (PIM).

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe generating updated coefficients for a passive intermodulation (PIM) model for mitigating (e.g., correcting) PIM in a signal. In a base station, transmit (TX) and receive (RX) radio frequency (RF) changes, RF band pass filters, duplexers, and diplexers can have severe memory effects due to their sharp transition bandwidth from pass band to stop band. PIM interference, generated by the TX signals and reflected onto the RX RF chain include these memory effects. These memory effects make PIM interference mitigation complex, requiring complicated computations and circuits. However, the embodiments herein use a PIM model for a PIM correction circuit that is adapted based on the data within the TX signals to avoid re-calculation of the PIM model, reducing processing time and resources used to mitigate PIM interference.

In a communication system using frequency division duplex (FDD), conventional techniques for correcting (e.g., mitigating) PIM use a large number of data samples to adapt the corresponding PIM model when the uplink signal power is higher than the PIM signal. In one embodiment, the PIM correction circuitry includes an equalizer that removes the memory effects caused by the RX channel or path. Thus, the equalized RX data only includes the effects of the PIM as well as the memory effects of the TX data. The correction circuitry can include a TX channel model which receives the TX data and models the memory effects of the TX channel or path on the TX data. The modeled TX data can then be input to a PIM correction circuitry to model the PIM. This modeled PIM is very dose to the PIM that is generated by the TX path. The modeled PIM is then subtracted from the equalized RX data, thereby removing (e.g., cancelling), or mitigating, the interference caused by the PIM. The RX data can then be processed using downstream digital signal processing circuits. Conventionally, to calculate the PIM mode, the transmit baseband data is used to adapt the PIM model. However, such a process re-calculates the entirety of the PIM model, which is processing time and processor resource extensive.

The PIM correction circuitry described herein determines the PIM model from the TX data paths such that the entirety of the PIM model is not re-calculated. For example, the PIM correction circuitry described herein uses auto-correlation and cross-correlation processes on the data within the data paths to adapt the PIM model, avoiding re-calculation of the PIM model, reducing processing time and processing resources used during the PIM correction (e.g., mitigation) process.

FIG. 1 is a block diagram of a base station 100 that experiences PIM interference 135, according to an example. The base station 100 includes an IC 105 that includes PIM correction circuitry 110 coupled between TX data and RX data paths. The TX data output by the IC 105 is processing by analog circuitry in a TX channel 115. In this example, the TX channel 115 includes a power amplifier (PA) 120 and a TX filter 125 (e.g., a BPF). In one embodiment, the base station 100 may use FDD to transmit and receive data with wireless devices (not shown). Although not shown, the IC 105 can include a baseband processor and digital to analog converters (DACs) to generate the different frequencies.

The base station 100 also includes a duplexer 130 that merges the TX channel 115 (which includes the TX data) with a RX channel 150. Thus, the base station 100 can use an antenna 160 to both transmit and receive signals. When receiving signals, the duplexer 130 ensures the RX signals are forwarded to an RX filter 145. That is, the duplexer 130 removes the RX signals from the shared TX/RX path after being received at the antenna 160, and forwards the RX signals to the RX filter 145.

Because the RX signals typically have much small amplitudes than the TX signals, a low-noise amplifier (LNA) 140 boosts the RX signals before they are transmitted to the baseband processor in the IC 105 for processing.

As shown, the TX signals create PIM interference 135 that has a negative impact of the RX band. For example, the PIM interference 135 in the TX signals from the TX channel can be reflected by an RF load (e.g., the antenna 160) due to imperfect impedance matching. This reflected PIM can then pass through the duplexer 130 and into the RX channel 150 which can make detecting actual RX data hard, if not impossible. Further, the TX filter 125, RX filter 145, the duplexer 130, and a diplexer (not used in this base station 100 implementation) can have severe memory effects due to their sharp transition bandwidth from pass band to stop band. PIM interference, generated by the TX signals and reflected onto the RX RF chain will include these memory effects.

The PIM correction circuitry 110 can mitigate or remove the PIM interference 135 from the RX signals which includes the memory effects caused by the various analog circuitry in the TX and RX channels 115, 150. In one or more example, the PIM correction circuitry 110 uses a PIM model to mitigate the effects of PIM interference 135. The details of the PIM model are described in the following.

In one embodiment, to save space and hardware costs, the base station 100 can be a carrier aggregation system where multiple carrier transmitters share the same TX channel. In that case, multiple transmitters and PAs generate signals at different frequencies—e.g., 1940 MHz and 1980 MHz for LTE—which are then combined into the same TX channel by a combiner. Further, PIM interference 135 can occur when combining any number of TX signals (e.g., three, four, ten, etc.) which can then negatively impact an RX signal that shares the same channel or path as the TX signals.

Figure 2:
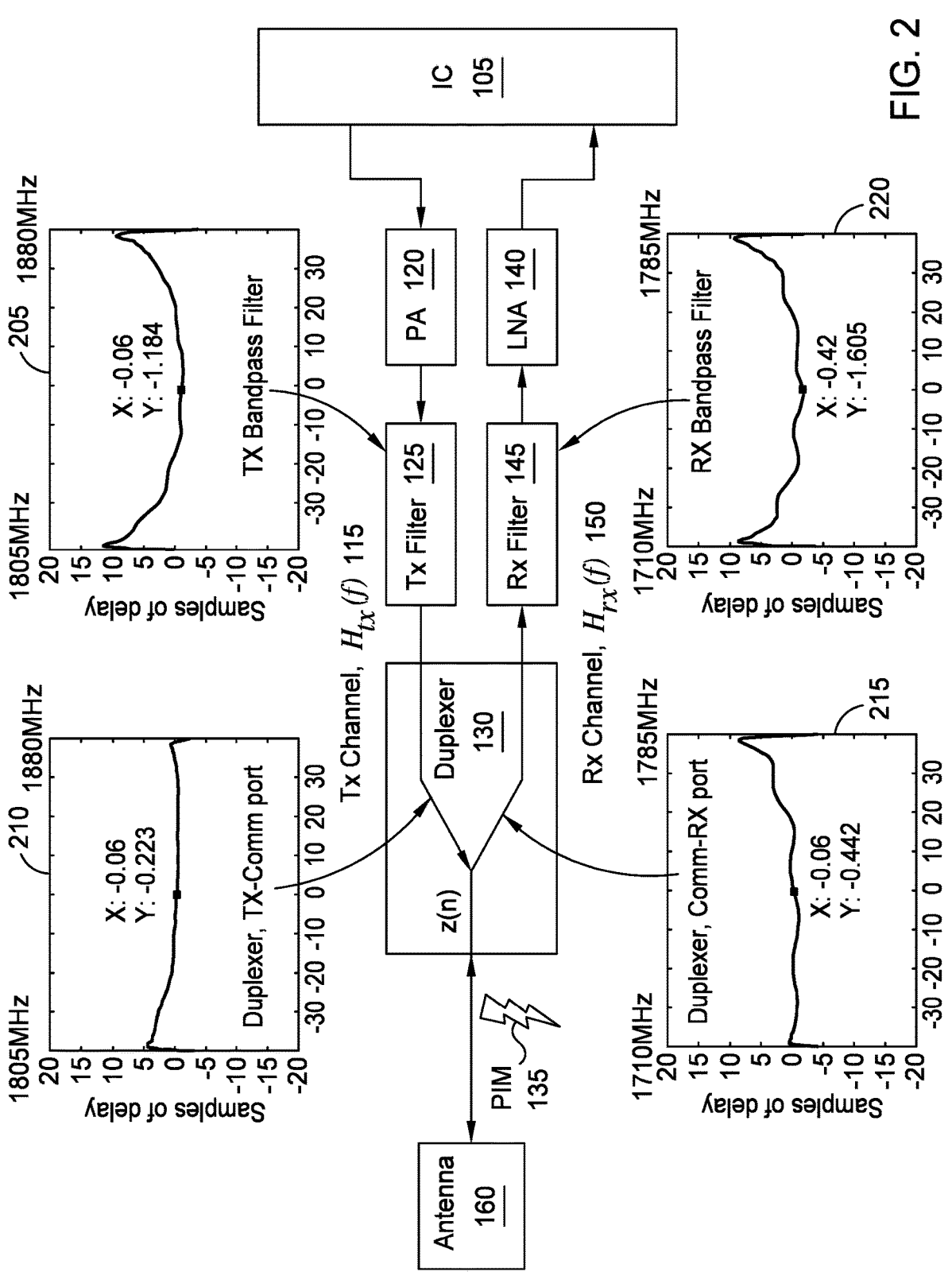
FIG. 2 illustrates factors that affect PIM.

FIG. 2 illustrates factors that affect PIM, according to an example. FIG. 2 illustrates a portion of the base station 100 in FIG. 1. Specifically, FIG. 2 illustrates the IC 105, the TX channel 115, the RX channel 150, the duplexer 130, and the antenna 160.

Chart 205 illustrates the group delay (the Y axis) according to frequency (X axis) for the TX filter 125. This group delay is at least particularly due to sharp gain changes in the TX filter 125 within a very narrow transition bandwidth. This results in memory effects in the PIM interference 135 generated by the multi-carrier or multi-band TX signals and are observed at a receiver in the IC 105.

Chart 210 illustrates the group delay (the Y axis) according to frequency (X axis) for the duplexer 130 when transmitting the TX signals from the TX channel 115. These memory effects also affect the PIM interference 135.

Chart 215 illustrates the group delay (the Y axis) according to frequency (X axis) for the duplexer 130 when receiving the RX signals from the antenna 160. These memory effects also affect the PIM interference 135.

Chart 220 illustrates the group delay (the Y axis) according to frequency (X axis) for the RX filter 145. These memory effects also affect the PIM interference 135.

FIG. 2 illustrates that the PIM interference may not be memoryless. That is, the memory effects from the TX filter 125, duplexer 130, and the RX filter 145 (as well as potentially other components such as a diplexer) can impact the PIM interference, thereby making a PIM correction algorithm complex and costly to implement since it should consider these memory effects when mitigating or removing the PIM from the RX signals.

Figure 7:
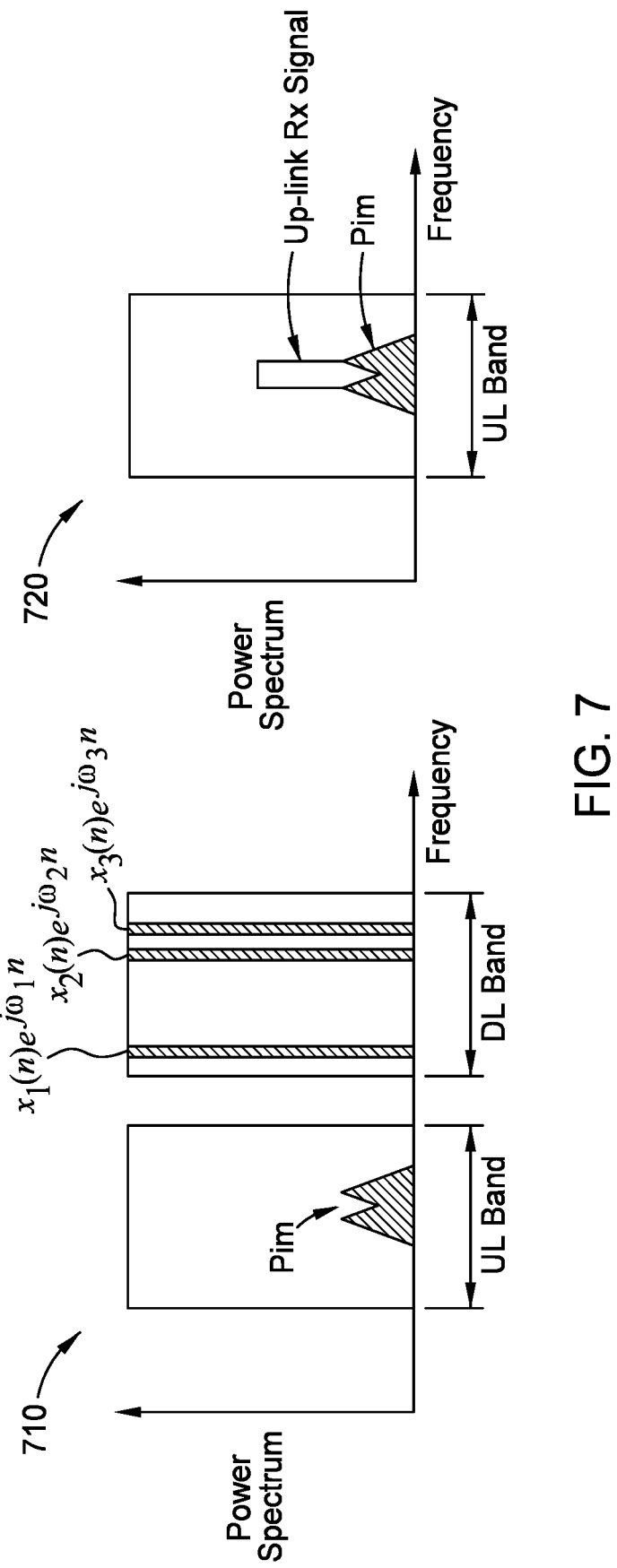
FIG. 7 includes graphs illustrating PIM interference as related to uplink receiving data.

FIG. 7 illustrates an example of PIM interference as related to uplink receiving data. In plot 710 plot of FIG. 7, $x_1(n)e^{j\omega_1 n}$, $x_2(n)e^{j\omega_2 n}$ and $x_3(n)e^{j\omega_3 n}$ are the transmit data using 3 carriers in a digital domain. $x_1(n)$, $x_2(n)$ and $x_3(n)$ are the base band modulation signals, and $e^{j\omega_1 n}$, $e^{j\omega_2 n}$ and $e^{j\omega_3 n}$ are the corresponding carriers. A $3^{rd}$ order PIM can be generated by the 3 carrier transmit data with the PIM frequencies inside the uplink band. Two $3^{rd}$ order PIM components $z_1(n)$ and $z_2(n)$ are generated inside the uplink band based on equations 1 and 2.

$$z_1(n) = x_1(n)x_1(n)x_2^*(n)e^{j\Delta\omega_1 n} \qquad \text{Equation 1}$$

$$z_2(n) = x_1(n)x_1(n)x_3^*(n)e^{j\Delta\omega_1 n} \qquad \text{Equation 2}$$

Where, $$x_2^*(n) \text{ and } x_3^*(n)$$

are the complex conjugate of base band signals $x_2(n)$ and $x_3(n)$. $\Delta\omega_1 = 2\omega_1 - \omega_2 - \omega_{UL}$ and $\Delta\omega_2 = 2\omega_1 - \omega_3 - \omega_{UL}$. $\omega_{UL}$ is the center rf frequency of the uplink band.

In the plot 710, the received uplink signals are overlapped with the PIM signals in the frequency domain. The PIM interference degrades the receiver sensitivity if not removed from the received data.

The received data can be expressed based on equation 3.

$$y(n) = y_{UL}(n) + y_{pim}(n) \qquad \text{Equation 3}$$

In equation 3, $\gamma_{ul}$ is the uplink receiving data, $\gamma_{pim}$ is the PIM interference.

The PIM interference can be modeled based on equation 4.

$$\hat{y}_{pim}(n) = C_1 z_1(n) + C_2 z_2 \qquad \text{Equation 4}$$

In equation 4, the complex coefficients $C_1$ and $C_2$ are the PIM model coefficients. If the PIM model signal is subtracted from the receive data. The PIM interference is removed from the uplink receiving signal.

$$y_{UL}(n) \rightarrow y(n) - \hat{y}_{pim}(n) \qquad \text{Equation 5}$$

In equation 5, The PIM model coefficients can be estimated by using Least Squares Method (LS) with large number of data samples of $x_1(n)$, $x_2(n)$, $x_3(n)$ and $y(n)$ with the following matrix cross correlation circuits between PIM models and received data as illustrated in equations 6 and 7.

$$w_1 = \frac{1}{N}\sum_{n=1}^{N} z_1^*(n)y(n) =$$

$$\frac{1}{N}\sum_{n=1}^{N} z_1^*(n)y_{pim}(n) + \frac{1}{N}\sum_{n=1}^{N} z_1^*(n)y_{UL}(n) \rightarrow \frac{1}{N}\sum_{n=1}^{N} z_1^*(n)y_{pim}(n)$$

Equation 6

$$w_2 = \frac{1}{N}\sum_{n=1}^{N} z_2^*(n)y(n) =$$

Equation 7

$$\frac{1}{N}\sum_{n=1}^{N} z_2^*(n)y_{pim}(n) + \frac{1}{N}\sum_{n=1}^{N} z_2^*(n)y_{UL}(n) \rightarrow \frac{1}{N}\sum_{n=1}^{N} z_2^*(n)y_{pim}(n)$$

Equations 8-10 illustrate the matrix cross correlation circuits between the PIM models.

$$v_{1,1} = \frac{1}{N}\sum_{n=1}^{N} z_1^*(n)z_1(n) \qquad \text{Equation 8}$$

$$v_{1,2} = \frac{1}{N}\sum_{n=1}^{N} z_1^*(n)z_2(n) \qquad \text{Equation 9}$$

$$v_{2,2} = \frac{1}{N}\sum_{n=1}^{N} z_2^*(n)z_2(n) \qquad \text{Equation 10}$$

The down-link transmit data and up-link data are independent, hence the PIM models in terms of down-link transmit data are independent with up-link data. The large data sample correlations correlation between two independent variables is approaching zero as illustrated in equations 11 and 12.

$$\frac{1}{N}\sum_{n=1}^{N} z_1^*(n)y_{UL}(n) \rightarrow 0 \qquad \text{Equation 11}$$

$$\frac{1}{N}\sum_{n=1}^{N} z_2^*(n)y_{UL}(n) \rightarrow 0 \qquad \text{Equation 12}$$

The PIM model coefficients can be calculated by the following LS method illustrated in equations 13, 14, and 15.

$$\begin{bmatrix} C_1 \\ C_2 \end{bmatrix} = V^{-1}W \qquad \text{Equation 13}$$

$$V = \begin{bmatrix} v_{1,1} & v_{1,2} \\ v_{1,2}^* & v_{2,2} \end{bmatrix} \qquad \text{Equation 14}$$

$$W = \begin{bmatrix} w_1 \\ w_2 \end{bmatrix} \qquad \text{Equation 15}$$

The power of up-link receiving data can be higher than the power of PIM. In this case, a very large number of data samples is needed to remove the uplink data effect on the PIM model determination. The number of samples can be as large are 100 thousand. Hence, to avoid the re-calculations of the PIM model components of $$z_1(n) = x_1(n)x_1(n)x_2^*(n)e^{j\Delta\omega_1 n} \text{ and } z_2(n) = x_1(n)x_1(n)x_3^*(n)e^{j\Delta\omega_1 n}$$

will save both DSP hardware resource and chip DC power consumptions.

Figure 3:
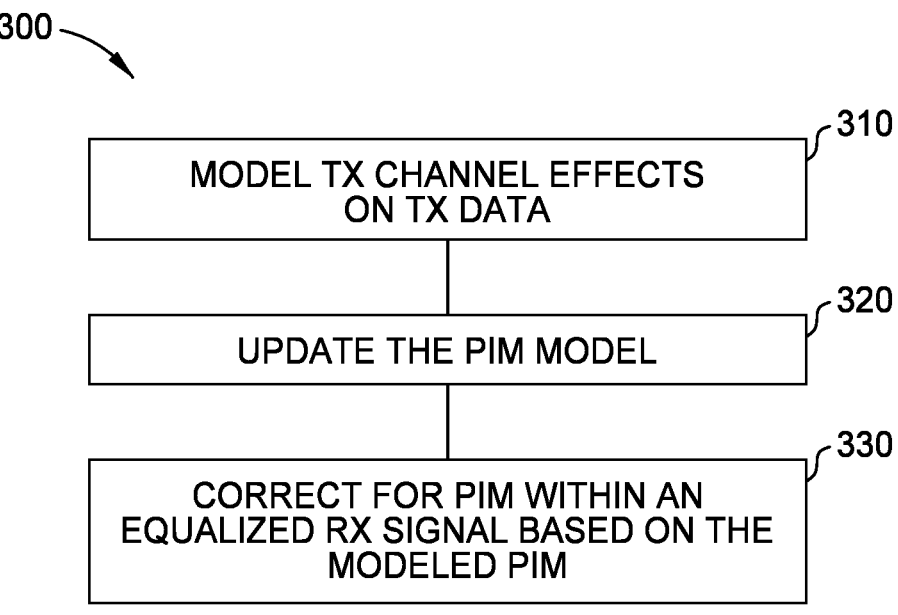
FIG. 3 is a flowchart for performing PIM correction.

FIG. 3 is a flowchart of a method 300 for performing PIM cancellation, according to an example. For clarity, the blocks in the method 300 in FIG. 3 are discussed in tandem with FIG. 4 which illustrates a PIM correction circuitry 400 (e.g., one implementation of the PIM correction circuitry 110 in FIG. 1). The PIM correction circuitry 400 is included within one or more IC devices. An IC device is chip. In one example, an IC device is a field programmable gate array (FPGA) or an application specific IC (ASIC), among others. In one example, an IC device is a system-on-chip (SoC).

Figure 4:
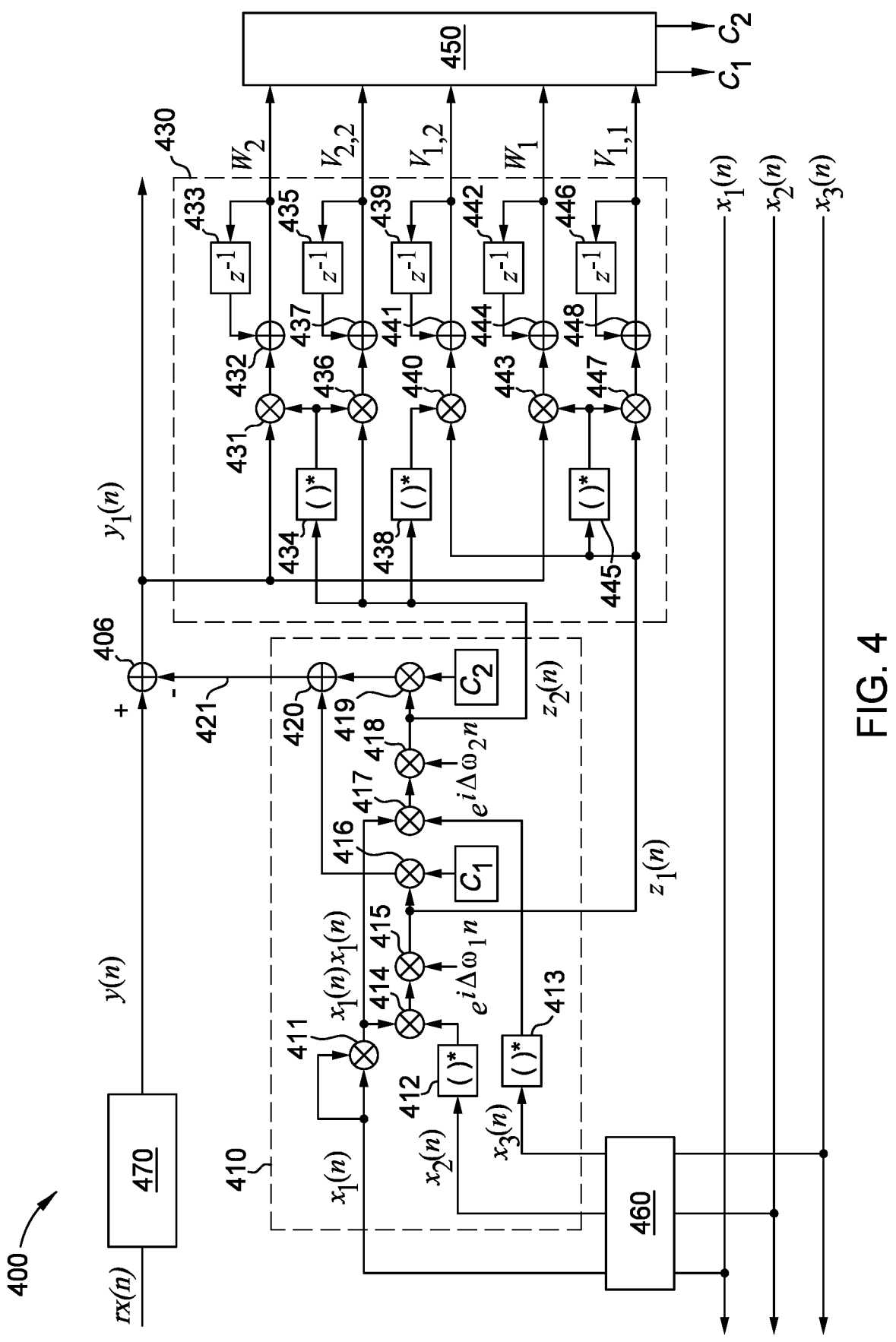
FIGS. 4, 5, and 6 illustrate PIM correction circuits.

At block 310, the PIM correction circuitry 400 models TX channel effects based on TX data. As shown in FIG. 4, in addition to transmitting the TX data to the TX channel 115, the TX data is also received at the modeling circuitry 460 which models the effects of the TX channel 115 on the TX data. Stated differently, the output of the modeling circuitry

460 is the same as the output of the TX channel 115. Accordingly, the modeling circuitry 460 mirrors or mimics the effects of the TX channel 115 on the TX data stream. As illustrated in FIG. 4, the modeling circuitry 460 receives the signals $tx_1(n)$, $tx_2(n)$, and $tx_3(n)$ of the TX channel 115 and generates output signals $x_1(n)$, $x_2(n)$ and $x_3(n)$. In other examples, the number of received signals may be greater than or less than three. The PIM model signals $z_1(n)$ and $z_2(n)$ are generated from the signals $x_1(n)$, $x_2(n)$, and $x_3(n)$, and are combined with the coefficients $C_1$ and $C_2$ to generate a correction signal 421. The signals $z_1(n)$ and $z_2(n)$ correspond to the modeled PIM data.

The modeling circuitry 410 includes multiplier circuits 411, 414, 415, 416, 417, 418, and 419, complex conjugate circuits 412 and 413, and adder circuit 420. The multiplier circuit 411 multiplies the signal $x_1(n)$ with the signal $x_1(n)$ to generate $x_1(n)x_1(n)$. The complex conjugate circuit 412 receives the signal $x_2(n)$ and generates the complex conjugate $$x_2^*(n),$$

and the complex conjugate circuit 413 receives the signal $x_3(n)$ and generates the complex conjugate $$x_3^*(n).$$

The multiplier circuit 414 multiplies $x_1(n)x_1(n)$ with $$x_2^*(n)$$

to generate $$x_1(n)x_1(n)x_2^*(n),$$

which is multiplied by the multiplier circuit 415 with $e^{i\Delta\omega_1 n}$ to generate $$x_1(n)x_1(n)x_2^*(n)e^{i\Delta\omega_1 n},$$

or the output signal $z_1(n)$. The multiplier circuit 416 multiplies $z_1(n)$ with the coefficient $C_1$ to generate $z_1(n)C_1$.

The multiplier circuit 417 multiplies $x_1(n)x_1(n)$ with $$x_3^*(n)$$

to generate $$x_1(n)x_1(n)x_3^*(n),$$

which is multiplied by the multiplier circuit 418 with $e^{i\Delta\omega_2 n}$ to generate $$x_1(n)x_1(n)x_3^*(n)e^{i\Delta\omega_2 n},$$

or the output signal $z_2(n)$. The multiplier circuit 419 multiplies $z_2(n)$ with the coefficient $C_2$ to generate $z_2(n)C_2$.

The adder circuit 420 adds $z_2(n)C_2$ with $z_1(n)C_1$ to generate correction signal 421 (e.g., $z_1(n)C_1+z_2(n)C_2$), which is subtracted by the subtraction circuit 406 from the input signal y(n).

In one example, the PIM correction circuitry 400 equalizes RX data to compensate for RX channel memory effects. The PIM correction circuitry 400 may include equalizer circuitry 470 which receives RX signals from the RX channel 150. As mentioned above, these RX signals can include PIM interference. Moreover, this PIM interference can be affected by the memory effects by the components in the TX and the RX channels. The equalizer circuitry mitigates or removes the memory effects caused by the RX channel 150 from the received RX signals. That is, after passing through the equalizer circuitry 470, the RX signals still have the PIM interference which includes the memory effects of the TX channel 115, but the memory effects from the RX channel 150 have been mitigated or removed.

In one embodiment, the equalizer circuitry is a digital equalizer that functions as a variable filter. The equalizer circuitry can add the inverse effect of the PIM on the RX channel 150. That is, the equalizer circuitry can make the group delay for the RX channel flat, so it is no longer frequency dependent.

The taps of the equalizer circuitry can be set or trained using a variety of different techniques. In one example, the base station can measure the channel effect in the RX channel 150 (e.g., the RX path from the duplexer 130 in FIG. 1 until the RX signals are received at the IC 105). In one embodiment, the base station may transmit calibration data along this path and measure the received RX signal to determine the characteristics (e.g., the group delay) of the RX channel 150. These characteristics can then be used to configure the taps of the equalizer circuitry.

The base station may recalibrate the equalizer circuitry at intervals (e.g., every few minutes) or after environmental conditions change (e.g., the temperature changes by several degrees). In this example, the PIM correction circuitry 400 can dynamically update the equalizer circuitry as the RX channel characteristics change.

At block 320, the PIM correction circuitry 400 updates (e.g., adapts) the model of the PIM based on the output of the modeling circuitry 410 (e.g., $z_1(n)$ and $z_2(n)$). In one example, the PIM correction circuitry 400 includes a PIM model adapt circuitry 430 and compensation circuitry 450. The PIM model adapt circuitry 430 generates update (LS) matrix circuit values (e.g., $W_1$, $W_2$, $V_{1,1}$, $V_{1,2}$, and $V_{2,2}$) that are used to generate coefficients to correct (e.g., mitigate or cancel) PIM interference so that the PIM interference is removed from the RX channel. That is, the PIM model adapt circuitry 430 output update values as signals that are received by the compensation circuitry 450, which generates the coefficients $C_1$, $C_2$. The coefficients are provided to the modeling circuitry 410, and used to correct (e.g., mitigate or cancel) the PIM interference from the input signal y(n).

In one example, the PIM model adapt circuitry 430 includes correlation circuitry (e.g., auto-correlation circuitry and cross-correlation circuitry) that generates the update values $$W_1, W_2, V_{1,1}, V_{1,2}^*, V_{1,2}, \text{ and } V_{2,2}$$

from the output signals $z_1(n)$ and $z_2(n)$. The correlation circuitry includes complex conjugate circuits 434, 438, and 445, multiplier circuits 431, 436, 440, 443, and 447, adder circuits 432, 437, 441, 444, and 448, and delay circuits 433, 435, 439, 442, and 446.

The complex conjugate circuit 434 receives the output signal $z_2(n)$ and generates complex conjugate $z_2^*(n)$. The multiplier circuit 431 multiplies the complex conjugate $z_2^*(n)$ with $y_1(n)$ to generate $y_1(n)z_2^*(n)$ (e.g., an intermediate signal). The adder circuit 432 adds $y_1(n)z_2^*(n)$ with a delayed version of the adder output that is delayed by delay circuit 433 to generate the update value $W_2$.

The multiplier circuit 436 multiplies the complex conjugate $z_2^*(n)$ with $z_2(n)$ to generate $z_2(n)z_2^*(n)$ (e.g., an intermediate signal). The adder circuit 437 adds $z_2(n)z_2^*(n)$ with a delayed version of the adder output that is delayed by delay circuit 435 to generate the update value $V_{2,2}$.

The complex conjugate circuit 438 receives the output signal $z_2(n)$ and generates complex conjugate $z_2^*(n)$. The multiplier circuit 440 multiplies the complex conjugate $z_2^*(n)$ with $z_1(n)$ to generate $z_1(n)z_2^*(n)$. The adder circuit 441 adds $z_1(n)z_2^*(n)$ with a delayed version of the output of the adder circuit 441 that is delayed by delay circuit 439 to generate the update value $V_{1,2}^*$.

The complex conjugate circuit 445 receives the output signal $z_1(n)$ and generates complex conjugate $z_1^*(n)$. The multiplier circuit 443 multiplies the complex conjugate $z_1^*(n)$ with $y_1(n)$ to generate $y_1(n)z_1^*(n)$. The adder circuit 444 adds $y_1(n)z_1^*(n)$ with a delayed version of the output of the adder circuit 444 that is delayed by delay circuit 442 to generate the update value $W_1$.

The multiplier circuit 447 multiplies the complex conjugate $z_1^*(n)$ with $z_1(n)$ to generate $z_1(n)z_1^*(n)$. The adder circuit 448 adds $z_1(n)z_1^*(n)$ with a delayed version of the output of the adder circuit 448 that is delayed by delay circuit 446 to generate the update value $V_{1,1}$.

The compensation circuitry 450 acquires values $$W_1, W_2, V_{1,1}, V_{1,2}^*, V_{1,2},$$

and $V_{2,2}$, after the accumulation of data samples and generates the coefficients $C_1$, $C_2$. For example, the compensation circuitry 450 may include one or more buffers that acquire one or more samples of the update values $$W_1, W_2, V_{1,1}, V_{1,2}^*, V_{1,2}, \text{ and } V_{2,2}.$$

In one example, the update values $$W_1, W_2, V_{1,1}, V_{1,2}^*, V_{1,2}, \text{ and } V_{2,2}$$

are values of the matrices V and W as defined by equations 1 and 2.

$$V = \begin{bmatrix} V_{1,1} & V_{1,2} \\ V_{1,2}^* & V_{2,2} \end{bmatrix} \qquad \text{Equation 16}$$

$$W = \begin{bmatrix} W_1 \\ W_2 \end{bmatrix} \qquad \text{Equation 17}$$

The compensation circuitry 450 generates the coefficients $C_1$ and $C_2$ based on equations 1 and 2. For example, the compensation circuitry 450 determines V and W from equations 1 and 2, and determines the coefficients $C_1$ and $C_2$ from V and W based on equations 3 and 4.

$$\begin{bmatrix} \Delta C_1 \\ \Delta C_2 \end{bmatrix} = V^{-1} W \qquad \text{Equation 18}$$

$$\begin{bmatrix} C_1 \\ C_2 \end{bmatrix} = \begin{bmatrix} C_1 \\ C_2 \end{bmatrix} + \begin{bmatrix} \Delta C_1 \\ \Delta C_2 \end{bmatrix} \qquad \text{Equation 19}$$

As is illustrated by Equations 3 and 4, the coefficients $C_1$ and $C_2$ are updated based on the previous values of the coefficients and the delta values determined from V and W as defined by Equation 3. The updated coefficients $C_1$ and $C_2$ are provided to the modeling circuitry 410.

At block 320, the PIM correction circuitry 400 uses the modeled PIM to correct for PIM within the equalized RX signals. For example, the modeling circuitry 410 receives the coefficients from the PIM model adapt circuitry 430, generates one or more correction signals (e.g., the correction signal 421), and uses the correction signal (or signals) to correct for (e.g., mitigate or cancel) PIM within the input signal y(n). The correction signal 421 is combined with the input signal y(n) to generate the corrected signal (e.g., output signal) $y_1(n)$. In one example, the correction signal 421 is subtracted from the signal y(n) by the subtraction circuit 406 to remove the PIM interference from the received RX signals. The output of the subtraction circuit 406 outputs signals to an uplink (UL) data decoder (not shown) for further processing.

Figure 5:
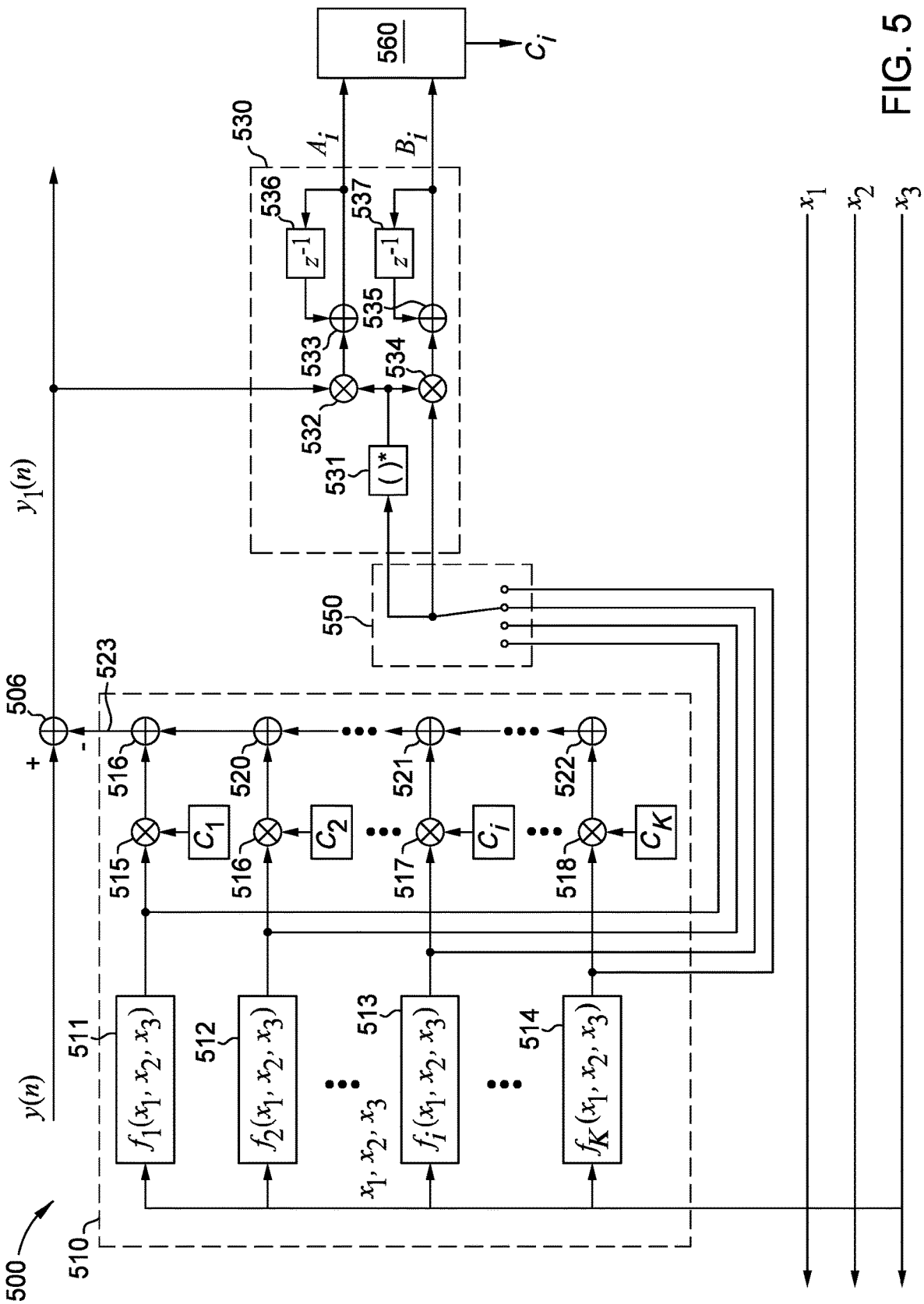

FIG. 5 illustrates a PIM correction circuitry 500, according to an example. The PIM correction circuitry 500 is one example of the PIM correction circuitry 110 of FIG. 1. The PIM correction circuitry 500 is included within one or more IC devices. In one example, the method 300 may be performed using the PIM correction circuitry 500 instead of the PIM correction circuitry 400. The PIM correction circuitry 500 includes modeling circuitry 510, PIM adaption circuitry 530, switch circuitry 550, and compensation circuitry 560. The PIM adaption circuitry 530 and the compensation circuitry 560 are connected to the modeling circuitry 510. In one example, a plurality of data samples are obtained to adapt the model adapt efficiently, which can use a sequential adapt of each PIM model with very high accuracy.

The modeling circuitry 510 includes signal circuits 511-514, multiplier circuits 515-518, and adder circuits 519-522. While the example of FIG. 5 illustrates four signal circuits (e.g., signal circuits 511-514), the number of signal circuits 511 and 514 may be greater than or less than four. In one example, the number of multiplier circuits 515-518, and the number of the adder circuits 519-522 corresponds to the number of signal circuits 511-514. Each of the signal circuits 511-514 receives the signals $x_1$, $x_2$, and $x_3$, and generates a corresponding signal $f_1$, $f_2$, $f_i$, and $f_K$. In one example, the signals $f_1$, $f_2$, $f_i$, and $f_K$ are orthogonal to each other. In one example, $$f_1 = x_1(n)x_1(n)x_2^*(n)e^{j\Delta\omega_1 n},$$

$$f_2 = x_1(n)x_1(n)x_3^*(n)e^{j\Delta\omega_2 n},$$

$$f_3 = x_1(n)x_1(n)x_2^*(n)x_2^*(n)x_3(n)e^{j\Delta\omega_3 n},$$

$$f_4 = x_1(n)x_1(n)x_3^*(n)x_3^*(n)x_2(n)e^{j\Delta\omega_4 n}.$$

The four PIM models are located at different frequencies. They are independent with a very large number of data sample correlation. In one example, "i" is three or more, and K is greater than "i". Each of the signals $f_1$, $f_2$, $f_i$, and $f_K$ may be formed from any combination of the signals $x_1$, $x_2$, and $x_3$.

The multiplier circuit 515 multiplies the signal $f_1$ with the coefficient $C_1$ to generate $f_1 C_1$, which is received by the adder circuit 519. The multiplier circuit 516 multiplies the signal $f_2$ with the coefficient $C_2$ to generate $f_2 C_2$, which is received by the adder circuit 520. The multiplier circuit 517 multiplies the signal $f_i$ with the coefficient $C_i$ to generate $f_i C_i$, which is received by the adder circuit 521. The multiplier circuit 518 multiplies the signal $f_K$ with the coefficient $C_K$ to generate $f_K C_K$, which is received by the adder circuit 522. In one example, the adder circuit 522 may be omitted. The outputs of each adder circuit 519-522 is added to the subsequent adder circuit 519-522 to generate the correction signal 523. The correction signal 523 is subtracted from the input signal y(n) by the subtractor circuit 506 to remove PIM interference and generate the output signal $y_1(n)$. In one example, the input signal y(n) is equalized by equalization circuitry before being received by the subtractor circuit 506.

The switch circuitry 550 selectively couples on of the signals $f_1$, $f_2$, $f_i$, and $f_K$ to an input of the PIM adaption circuitry 530. In one example, the switch circuitry 550 receives a control signal from control logic (e.g., the compensation circuitry 560 or other control circuitry within the PIM correction circuitry 500).

The PIM adaption circuitry 530 includes complex conjugate circuit 531, multiplier circuits 532 and 534, adder circuits 533 and 535, and delay circuits 536 and 537. The PIM adaption circuitry 530 generations update values A and B for each of the signals $f_1$, $f_2$, $f_i$, and $f_K$. In one example, the PIM adaption circuitry 530 receives the signal $f_i$ and generates update values $A_i$ and $B_i$.

The complex conjugate circuit 531 receives the signal $f_i$, and generates the complex conjugate $$f_i^*.$$

The multiplier circuit 532 receives the complex conjugate $f_i^*$ and the output signal $y_1(n)$, and generates $$f_i^* y_1(n).$$

The adder circuit 533 adds $$f_i^* y_1(n)$$

with a delayed version of the output of the adder circuit 533, which is delayed by delay circuit 536, to generate the update value $A_i$.

The multiplier circuit 534 receives the complex conjugate $$f_i^*$$

and the signal $f_i$, and generates $$f_i^* f_i.$$

The adder circuit 535 adds $$f_i^* f_i$$

with a delayed version of the output of the adder circuit 535, which is delayed by delay circuit 536, to generate the update value $B_i$.

The above process is repeated for each of the signals $f_1$-$f_K$, generating corresponding update values A and B for each of the signals $f_1$-$f_K$.

The compensation circuitry 560 receives the update values A and B and generates a corresponding coefficient C. In one example, the compensation circuitry 560 receives the update values $A_i$ and $B_i$ and generates the coefficient $C_i$ from the update values $A_i$ and $B_i$. The compensation circuitry 560 uses equations 5 and 6 to determine the updated coefficient C.

$$\Delta C_i = \frac{A_i}{B_i + \epsilon} \qquad \text{Equation 20}$$

$$C_i^{next} = C_i^{current} + \Delta C_i \qquad \text{Equation 21}$$

In equation 5, $\epsilon$ is a small positive number.

$$C_i^{current}$$

is the current value of the coefficient C, and $$C_i^{next}$$

is the updated coefficient C determined from the update values A and B.

As compared to the PIM correction circuitry 400, the PIM correction circuitry 500 has a reduced circuit area, reducing the cost of the corresponding semiconductor device.

Figure 6:
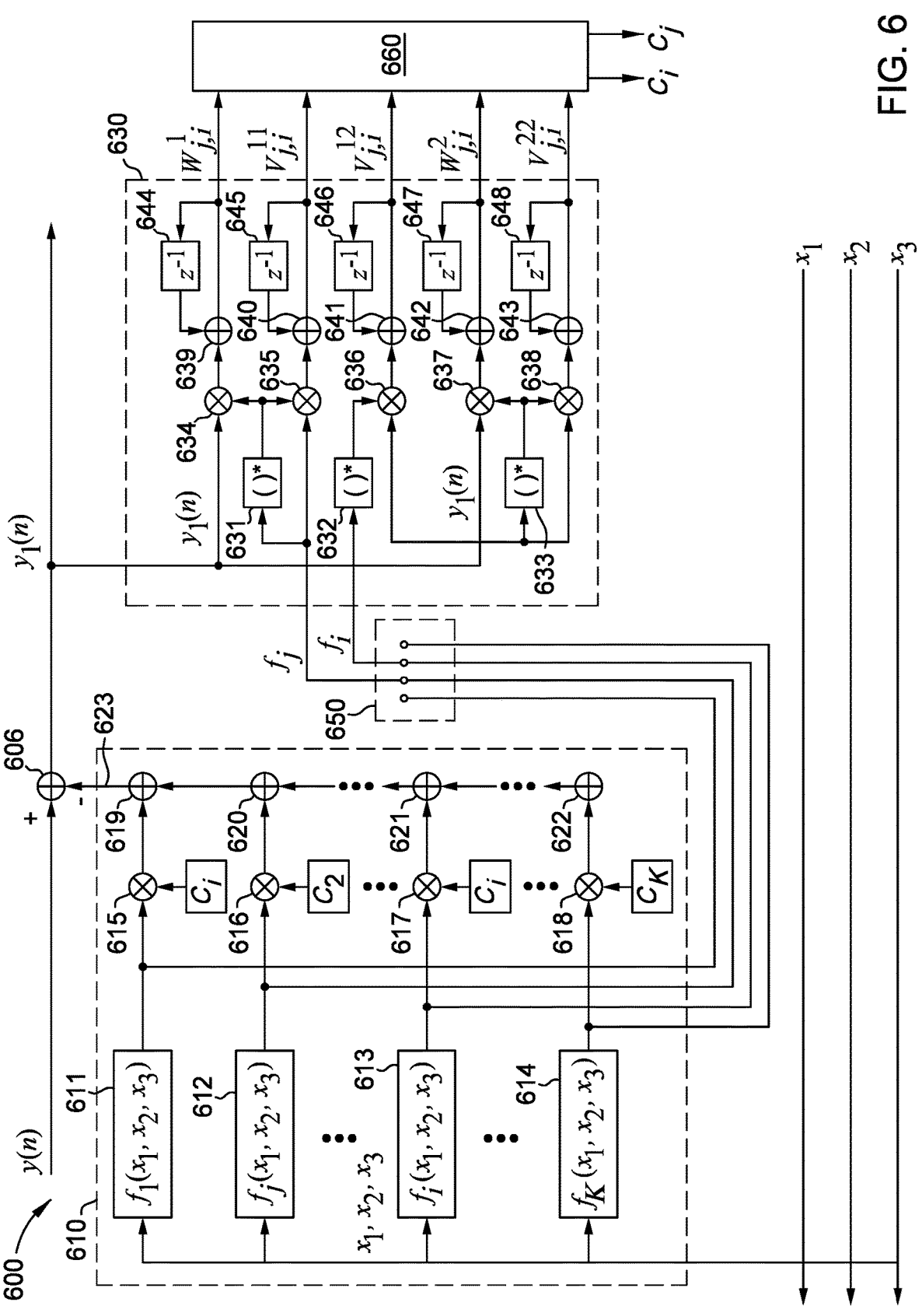

FIG. 6 illustrates a PIM correction circuitry 600, according to an example. The PIM correction circuitry 600 is an example of the PIM correction circuitry 110. The PIM correction circuitry 600 is included within one or more IC devices. The PIM correction circuitry 600 includes modeling circuitry 610, PIM adaption circuitry 630, switch circuitry 650, and compensation circuitry 660.

The modeling circuitry 610 includes signal circuits 611-614, multiplier circuits 615-518, and adder circuits 619-522.

While the modeling circuitry 610 is illustrated as included four signal circuits 611-614, in other examples, the modeling circuitry 610 may include more than or less than four signal circuits 611-614. In one example, the number of multiplier circuits 615-618, and the number of the adder circuits 619-622 corresponds to the number of signal circuits 611-614. Each of the signal circuits 611-614 receives the signals $x_1$, $x_2$, and $x_3$, and generates a corresponding PIM model signals $f_1$, $f_j$, $f_i$, and $f_K$. In one example, j is two or more, i is greater than j, and K is greater than i. In one example, the signals $f_1$, $f_j$, $f_i$, and $f_K$ may be formed from any combination of the signals $x_1$, $x_2$, and $x_3$.

The multiplier circuit 615 multiplies the signal $f_i$ with the coefficient C, to generate $f_1C_1$, which is received by the adder circuit 619. The multiplier circuit 616 multiplies the signal $f_j$ with the coefficient $C_j$ to generate $f_1C_j$, which is received by the adder circuit 620. The multiplier circuit 617 multiplies the signal $f_i$ with the coefficient $C_i$ to generate $f_iC_i$, which is received by the adder circuit 621. The multiplier circuit 618 multiplies the signal $f_K$ with the coefficient $C_K$ to generate $f_KC_K$, which is received by the adder circuit 622. In one example, the adder circuit 622 may be omitted. The outputs of each adder circuit 619-622 is added to the subsequent adder circuit 619-622 to generate the correction signal 623. The correction signal 623 is subtracted from the input signal y(n) by the subtractor circuit 606 to remove PIM interference and generate the output signal $y_1$(n). In one example, the PIM correction circuitry 600 includes equalizer circuitry that receives the input signal y(n) and generates an equalized input signal y(n). In such an example, the correction signal 623 is subtracted from the equalized input signal y(n) to generate the output signal $y_1$(n).

The switch circuitry 650 selectively couples two of the signals $f_1$, $f_j$, $f_i$, and $f_K$ to an input of the PIM adaption circuitry 630. The selected two signals are with strong correlation. In one example, the switch circuitry 650 receives a control signal from control logic (e.g., the compensation circuitry 660 or other control circuitry within the PIM correction circuitry 600). The switch circuitry 650 includes one or more switches or multiplexers that are configured to selectively couple two of the signals $f_1$, $f_j$, $f_i$, and $f_K$ with the PIM adaption circuitry 630.

The PIM adaption circuitry 630 includes complex conjugate circuits 631-633, multiplier circuits 634-638, adder circuits 639-643, and delay circuits 644-648. The PIM adaption circuitry 630 generations update values $$W_{j,i}^1, V_{j,i}^{11}, V_{j,i}^{12}, W_{j,i}^2, \text{ and } V_{j,i}^{22}$$

for pairs of the signals $f_1$, $f_j$, $f_i$, and $f_K$.

In one example, the PIM adaption circuitry 630 receives signals $f_j$ and $f_i$, and the output signal $y_1$(n). The complex conjugate circuit 631 receives the signal $f_j$, and generates the complex conjugate $$f_j^*.$$

The multiplier circuit 634 receives the complex conjugate $$f_j^*$$

and the output signal $y_1$(n), and generates $$f_j^* y_1(n).$$

The adder circuit 639 adds $$f_j^* y_1(n)$$

with a delayed version of the output of the adder circuit 639 that is delayed by delay circuit 644 to generate the update value $$W_{j,i}^1.$$

The multiplier circuit 635 receives the complex conjugate $f^*_j$ and the signal $f_j$, and generates $$f_j^* f_j.$$

The adder circuit 640 adds $$f_j^* f_j$$

with a delayed version of the output of the adder circuit 640 that is delayed by delay circuit 645 to generate the update value $$V_{j,i}^{11}.$$

The complex conjugate circuit 633 receives the signal $f_i$, and generates the complex conjugate $$f_i^*.$$

The multiplier circuit 637 receives the complex conjugate $$f_i^*$$

and the output signal $y_1$(n), and generates $$f_i^* y_1(n).$$

The adder circuit 642 adds $$f_i^* y_1(n)$$

with a delayed version of the output of the adder circuit 642 that is delayed by delay circuit 647 to generate the update value $$W_{j,i}^2.$$

The multiplier circuit 636 receives the complex conjugate $$f_j^*$$

and the signal $f_i$, and generates $f_j^* f_i$. The adder circuit 641 adds $f_j^* f_i$ with a delayed version of the output of the adder circuit 641 that is delayed by delay circuit 646 to generate the update value $$V_{j,i}^{12}.$$

The multiplier circuit 638 receives the complex conjugate $$f_i^*$$

and the signal $f_i$, and generates $$f_i^* f_i.$$

The adder circuit 643 adds $$f_i^* f_i$$

with a delayed version of the output of the adder circuit 643 that is delayed by delay circuit 648 to generate the update value $$V_{j,i}^{22}.$$

The above process is repeated for signals $f_1-f_K$, generating corresponding update values update values $$W_{j,i}^1, V_{j,i}^{11}, V_{j,i}^{12}, \text{ and } W_{j,i}^2$$

for each of the signals $f_1-f_K$. In one example, two signals having the frequency locations are selected by the switch circuitry 650 for processing by the PIM adaption circuitry 630.

The compensation circuitry 660 receives the update values $$W_{j,i}^1, V_{j,i}^{11}, V_{j,i}^{12},$$

and $$W_{j,i}^2$$

for respective pairs of the signals $f_1-f_K$, and generates a corresponding coefficients $C_i$, and $C_j$. In one example, the compensation circuitry 660 receives the update values $$W_{j,i}^1, V_{j,i}^{11}, V_{j,i}^{12}, \text{ and } W_{j,i}^2,$$

and generates the coefficients $C_i$ and $C_j$ from the update values $$W_{j,i}^1, V_{j,i}^{11}, V_{j,i}^{12}, \text{ and } W_{j,i}^2.$$

The compensation circuitry 560 uses equations 7, 8, 9, and 10 to determine the coefficients $C_i$ and $C_j$.

$$V = \begin{bmatrix} V_{j,i}^{11} & V_{j,i}^{12} \\ V_{j,i}^{12*} & V_{j,i}^{2,2} \end{bmatrix} \qquad \text{Equation 22}$$

$$W = \begin{bmatrix} W_{j,i}^1 \\ W_{j,i}^2 \end{bmatrix} \qquad \text{Equation 23}$$

$$\begin{bmatrix} \Delta C_j \\ \Delta C_i \end{bmatrix} = V^{-1} W \qquad \text{Equation 24}$$

$$\begin{bmatrix} C_j \\ C_i \end{bmatrix} = \begin{bmatrix} C_j \\ C_i \end{bmatrix} + \begin{bmatrix} \Delta C_j \\ \Delta C_i \end{bmatrix} \qquad \text{Equation 25}$$

In one or more examples, the compensation circuitry 660 receives one or more samples $$W_{j,i}^1, V_{j,i}^{11}, V_{j,i}^{12}, \text{ and } W_{j,i}^2,$$

buffers the samples, and uses the samples to determine the updated coefficients $C_i$ and $C_j$ based on equations 7-10. The PIM correction circuitry 500 may be used some of the same circuitry as discussed in FIG. 4, as indicated by the use of the same reference numbers, which is not discussed in detail here.

As compared to the PIM correction circuitry 400, the PIM correction circuitry 600 has a reduced circuit area, reducing the cost of the corresponding semiconductor device. Further, as compared to the PIM correction circuitry 500, the PIM correction circuitry 600 is able to determine the updated coefficients for each of the signals $f_1-f_K$ in a shorter period of time, using less processing time.

In the preceding, reference is made to embodiments presented in this disclosure. However, the scope of the present disclosure is not limited to specific described embodiments. Instead, any combination of the described features and circuits, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered circuits or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A passive intermodulation correction circuitry comprising:

modeling circuitry configured to receive one or more transmitter data signals, generate output signals based on the one or more transmitter data signals, and generate a correction signal based on the output signals and correction coefficients, wherein the correction signal is combined with an input signal to generate a corrected output signal;

adapt circuitry configured to:

receive a first output signal of the output signals and the corrected output signal; and correlate the first output signal with the corrected output signal to generate update values by adding a first intermediate signal with a delayed version of the first intermediate signal, the first intermediate signal is generated based on a complex conjugate of the first output signal and the corrected output signal; and compensation circuitry configured to receive the update values and generate updated correction coefficients based on the update values.

2. The passive intermodulation correction circuitry of claim 1, wherein the modeling circuitry is further configured to:

combine the first output signal with a first updated correction coefficient of the updated correction coefficients; and combine a second output signal of the output signals with a second updated correction coefficient of the updated correction coefficients, and wherein the correction signal is determined based on the combination of the first output signal with the first updated correction coefficient and the second output signal with the second updated correction coefficient.

3. The passive intermodulation correction circuitry of claim 1, wherein the adapt circuitry is further configured to receive a second output signal of the output signals, and correlate the second output signal with the corrected output signal.

4. The passive intermodulation correction circuitry of claim 1, wherein the adapt circuitry comprises:

a first complex conjugate circuit configured to generate the complex conjugate of the first output signal;

a first multiplier circuit configured to multiply the complex conjugate of the first output signal with the corrected output signal to generate the first intermediate signal; and a first adder circuit configured to add the first intermediate signal with the delayed version of the first intermediate signal to generate a first update value of the update values.

5. The passive intermodulation correction circuitry of claim 4, wherein the adapt circuitry further comprises:

a second multiplier circuit configured to multiply the complex conjugate of the first output signal with the first output signal to generate a second intermediate signal; and a second adder circuit configured to add the second intermediate signal with a delayed version of the second intermediate signal to generate a second update value of the update values.

6. The passive intermodulation correction circuitry of claim 5, wherein the adapt circuitry comprises:

a second complex conjugate circuit configured to generate a complex conjugate of a second output signal of the output signals;

a third multiplier circuit configured to multiply the complex conjugate of the second output signal with the corrected output signal to generate a third intermediate signal;

an third adder circuit configured to add the third intermediate signal with a delayed version of the third intermediate signal to generate a third update value of the update values;

a fourth multiplier circuit configured to multiply the complex conjugate of the second output signal with the second output signal to generate a fourth intermediate signal; and a fourth adder circuit configured to add the fourth intermediate signal with a delayed version of the fourth intermediate signal to generate a fourth update value of the update values.

7. The passive intermodulation correction circuitry of claim 1 further comprising switch circuitry configured to selectively couple the output signals with the adapt circuitry.

8. The passive intermodulation correction circuitry of claim 7, wherein the switch circuitry is configured to selectively couple pairs of the output signals with the adapt circuitry.

9. An integrated circuit (IC) device comprising:

passive intermodulation (PIM) correction circuitry comprising:

modeling circuitry configured to receive one or more transmitter data signals, generate output signals based on the one or more transmitter data signals, and generate a correction signal based on the output signals and correction coefficients, wherein the correction signal is combined with an input signal to generate a corrected output signal;

adapt circuitry configured to receive a first output signal of the output signals and the corrected output signal, and correlate the first output signal with the corrected output signal to generate update values by adding a first intermediate signal with a delayed version of the first intermediate signal, the first intermediate signal is generated based on a complex conjugate of the first output signal and the corrected output signal; and compensation circuitry configured to receive the update values and generate updated correction coefficients based on the update values and the correction coefficients.

10. The IC device of claim 9, wherein the modeling circuitry is further configured to:

combine the first output signal with a first updated correction coefficient of the updated correction coefficients; and combine a second output signal of the output signals with a second updated correction coefficient of the updated correction coefficients, and wherein the correction signal is determined based on the combination of the first output signal with the first updated correction coefficient and the second output signal with the second updated correction coefficient.

11. The IC device of claim 9, wherein the adapt circuitry is further configured to receive a second output signal of the output signals, and correlate the second output signal with the corrected output signal.

12. The IC device of claim 9, wherein the adapt circuitry comprises:

a first complex conjugate circuit configured to generate the complex conjugate of the first output signal;

a first multiplier circuit configured to multiply the complex conjugate of the first output signal with the corrected output signal to generate the first intermediate signal; and an first adder circuit configured to add the first intermediate signal with the delayed version of the first intermediate signal to generate a first update value of the update values.

13. The IC device of claim 12, wherein the adapt circuitry further comprises:

a second multiplier circuit configured to multiply the complex conjugate of the first output signal with the first output signal to generate a second intermediate signal; and a second adder circuit configured to add the second intermediate signal with a delayed version of the second intermediate signal to generate a second update value of the update values.

14. The IC device of claim 13, wherein the adapt circuitry comprises:

a second complex conjugate circuit configured to generate a complex conjugate of a second output signal of the output signals;

a third multiplier circuit configured to multiply the complex conjugate of the second output signal with the corrected output signal to generate a third intermediate signal;

an third adder circuit configured to add the third intermediate signal with a delayed version of the third intermediate signal to generate a third update value of the update values;

a fourth multiplier circuit configured to multiply the complex conjugate of the second output signal with the second output signal to generate a fourth intermediate signal; and a fourth adder circuit configured to add the fourth intermediate signal with a delayed version of the fourth intermediate signal to generate a fourth update value of the update values.

15. The IC device of claim 9, wherein the PIM correction circuitry further comprises switch circuitry configured to selectively couple the output signals with the PIM correction circuitry.

16. A method comprising:

outputting a corrected output signal based on an input signal and a correction signal;

receiving, via modeling circuitry of passive intermodulation (PIM) correction circuitry, one or more transmitter data signals;

generating, via the modeling circuitry, output signals based on the one or more transmitter data signals, and generating the correction signal based on the output signals and correction coefficients; and correlating, via adapt circuitry of the PIM correction circuitry, a first output signal of the output signals with the corrected output signal to generate one or more update values by adding an intermediate signal with a delayed version of the intermediate signal, the intermediate signal is generated based on a complex conjugate of the first output signal and the corrected output signal; and generating updated correction coefficients based on the update values.

17. The method of claim 16 further comprising:

combining the first output signal with a first updated correction coefficient of the updated correction coefficients; and combining a second output signal of the output signals with a second updated correction coefficient of the updated correction coefficients, and wherein the correction signal is generated based on the combination of the first output signal with the first updated correction coefficient and the second output signal with the second updated correction coefficient.

18. The method of claim 16 further comprising:

correlating a second output signal of the output signals with the corrected output signal to generate the one or more update values.

19. The method of claim 16 further comprising:

generating the complex conjugate of the first output signal;

multiplying the complex conjugate of the first output signal with the corrected output signal to generate a first intermediate signal; and adding the first intermediate signal with the delayed version of the first intermediate signal to generate a first update value of the update values.

20. The method of claim 19 further comprising:

multiplying the complex conjugate of the first output signal with the first output signal to generate a second intermediate signal; and adding the second intermediate signal with a delayed version of the second intermediate signal to generate a second update value of the update values.

* * * * *